Figure 1:
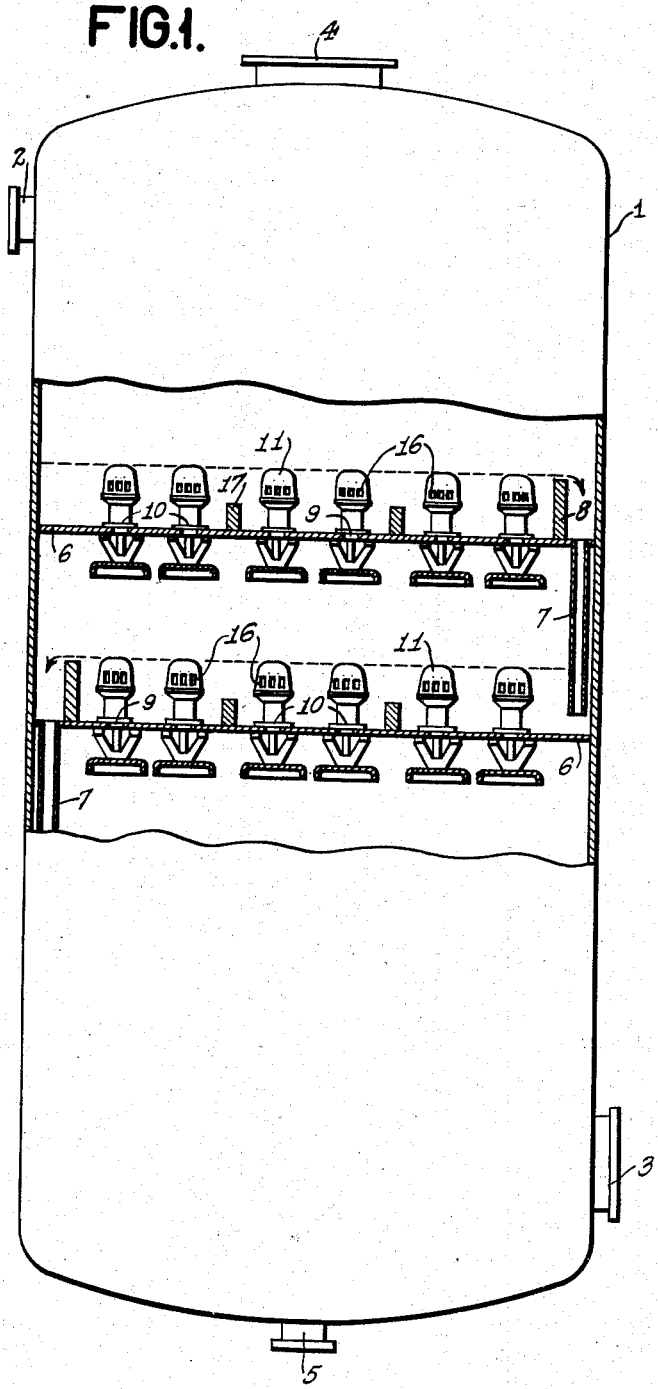

June 26, 1945.   W. C. ROUSSEAU   2,378,952
COUNTER CURRENT CONTACTING APPARATUS
Filed May 27, 1942

William C. Rousseau
INVENTOR

BY
Hoguet Neary & Campbell
ATTORNEYS

Patented June 26, 1945

2,378,952

UNITED STATES PATENT OFFICE 2,378,952

COUNTERCURRENT CONTACTING APPARATUS

William C. Rousseau, Reading, Mass., assignor to E. B. Badger & Sons Co., Boston, Mass., a corporation of Massachusetts Application May 27, 1942, Serial No. 444,730

4 Claims. (Cl. 261—114)

The present invention relates to counter-current contacting apparatus, and more particularly to an improvement in bubbler caps and auxiliary devices cooperating therewith which may be utilized to increase the effectiveness, usefulness, efficiency, and other advantages of counter-current contacting apparatus.

The use of counter-current contacting apparatus is advantageous to facilitate the intimate commingling of gases and liquids. The purpose of such commingling may be, for example, to effect physical or chemical changes in either or both of the components, such as, for example, by distillation, condensation, dissolution, or chemical reaction or to accomplish any other object of commingling gases and liquids, or it may be a combination of two or more of the foregoing.

Illustrative of the many types of counter-current contacting apparatuses utilized in the art to which the present invention is applicable are, for example, dephlegmating, rectifying, or fractionating columns, bubble towers, plate stills or columns, scrubbing apparatuses and reaction chambers, as well as other apparatuses suitable for carrying out processes or combinations of processes operated on the counter-current contacting principle.

The commercial adaptation of counter-current contacting apparatus to industrial processes is well established, a foremost example being the petroleum industry where the apparatus is utilized in the purification, distillation and other treatment of mineral oils and gases. Other industrial applications are the purification, deodorization and distillation of vegetable and animal fats and oils and fatty acids, and the treatment of alcohols and other organic compounds.

It is intended that the present invention may be applied to all the uses described above by way of illustration as well as any others not specifically mentioned.

In a conventional counter-current contacting apparatus, a liquid is caused to flow downwardly through the apparatus over a plurality of spaced horizontally disposed plates while a gas is caused to flow upwardly through the apparatus, i. e., counter-currently to the flow of liquid. Each plate generally is provided with means for maintaining a predetermined level of liquid thereon. In order to obtain the desired chemical or physical interreaction, heat transference or other object of counter-currently flowing the liquid and gas through the apparatus, an effective commingling of the gas and liquid at each plate, preferably so that the desired chemical or physical interreaction, etc., will reach an equilibrium at each plate, is desired. To effect the commingling of the gas and liquid it has been conventional to disperse the gas throughout the body of liquid on each plate by admitting the same through a plurality of apertures in the plates, the apertures being provided with short tubes secured in the plate or made integral therewith to form a passageway for the gas. The apertures and the tubes extending upwardly therefrom generally are covered by a cap or hood, conventionally referred to in the art as a bubbler cap, the lower edge of which generally is serrated or provided with apertures or slots through which the gas may pass. At high rates of flow, the gas also may issue from beneath the cap. It has been conventional heretofore to mount the bubbler caps with the lower edge on or adjacent the plate and they may be in fixed position or susceptible to being moved vertically by the pressure of the gas.

It is desirable to operate the counter-current contacting apparatus at as high a rate of flow as possible while still maintaining effective and efficient operation inasmuch as at higher rates of flow the capacity of the apparatus is proportionately increased. It is a disadvantage of the prior art constructions, however, that the apparatus cannot be used effectively and efficiently at relatively high rates of flow. For example, at high rates of flow there is observed the phenomenon of slot siphon, which is a coined term meaning the action of impinging jets of vapor from slots in adjacent caps in lifting the liquid between the caps and throwing it above the level of the caps. In the constructions utilized heretofore, the siphoned liquid cannot easily be replaced by additional liquid flowing into the space between the caps from below with the result that the plate becomes locally starved of liquid and serious surging or spurting occurs. The surging and spurting defeats the primary object of intimately commingling the gas and liquid and inefficient operations result. Also, it has been observed that the surging and spurting which occurs generally is accompanied by greater entrainment of the liquid in the gas which materially affects the effectiveness of the process.

The above described disadvantages as well as others inherent in the counter-current contacting apparatus of the prior art may be overcome, in accordance with the present invention, by an improvement in the bubbler caps and the use of auxiliary devices, whereby it may be possible to operate the apparatus at a greatly increased rate of flow and with greater efficiency. The construction of the bubbler caps and cooperating devices, in accordance with the present invention, may be used successfully to prevent unsmooth working of the apparatus even at the higher rates of flow, so that starvation of the plate areas adjacent the bubbler caps and the resulting spurting and surging may be effectively avoided.

In accordance with the present invention, the bubbler caps are blocked at the bottom and spaced from the surface of the plate. At the same time, the level of the liquid on the plates is raised to compensate for the elevated position of the bubbler caps, and means also are provided for causing mixing of the liquid despite the higher level and for reducing entrainment.

Figure 2:
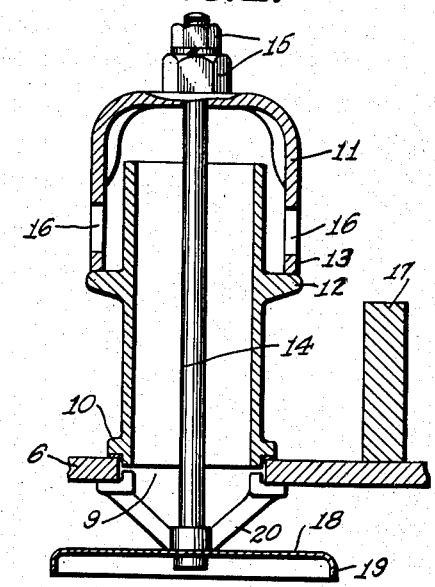

In order that the invention may be more clearly understood, reference may be had to the accompanying drawing, in which:

Fig. 1 is a diagrammatic sketch of the counter-current contacting apparatus; and Fig. 2 is an enlarged view, partly in cross-section, of the bubbler cap and cooperating elements.

In the drawing, the counter-current contacting apparatus shown is one which is adapted to receive a liquid and a gas adjacent the top and bottom, respectively. This arrangement has been shown merely for convenience, inasmuch as it will be appreciated that counter-current contacting apparatus may be operated, if desired, merely by the admission of a condensable gas, the liquid being provided by condensation or reflux of the condensed gas. Conversely, the gas may be provided by the vaporization of a liquid admitted at the top of the apparatus. On the other hand, it also would be possible to utilize more than one gas or more than one liquid. All such variations of the apparatus are well known to one skilled in the art and are intended to be included within the scope of the invention. Merely for convenience, however, the description will be limited to the use of the apparatus with a single gas and a single liquid. The term "gas" is used herein as generic to and including vapors.

Referring to the drawing, the liquid to be treated may be admitted to the apparatus 1 by means of a conduit 2 adjacent the top thereof and the gas may be admitted by means of a conduit 3 adjacent the bottom thereof. Conventional means (not shown in the drawing) may be utilized, if desired, in combination with the conduits for distributing the gas or liquid within the apparatus. Conduits 4 and 5 are provided for withdrawing gaseous and liquid products respectively.

The apparatus 1 is formed with a plurality of horizontal plates 6 disposed at spaced intervals throughout the entire length. Down-comers 7 are provided at alternate ends of the plates 6 for transferring liquid downwardly from plate to plate. Adjacent the down-comers 7 are dams 8 for maintaining a level of liquid on the plates 6. At any intermediate plate 6, the liquid is received at one end from an upper plate by means of a down-comer 7. The liquid then passes across the plate and upon reaching the level of the dam spills over into a down-comer 7 whereby it is transferred to a lower plate, and the movement is then repeated on the lower plate.

Each plate 6 is provided with a plurality of apertures 9 over which are positioned risers 10 for the bubbler caps 11. The risers 10 form fluid passageways extending upwardly from the apertures in the plates. The number of such apertures and risers is not critical and may be varied over a wide range depending upon the contemplated use of the apparatus and other factors. The risers 10 and bubbler caps 11 are shown in the drawing as circular in cross-section, but this has been done merely for convenience. The invention does not reside in the bubbler caps themselves and it is intended that any of the available types may be used such as, for example, those which are square shaped or the so-called "tunnel" type which are long rectangular caps. In general, the type of bubbler cap utilized will depend upon the desired characteristics of the apparatus and the process to be carried out and it is intended that the present invention may be applied to all these various types.

In general, it is preferred, for convenience, to utilize risers having a cross-section similar to that of the bubbler caps, but this is not essential, it being apparent from the present description, for example, that a square riser may be used with a round cap, etc. Each riser is provided with a ledge 12 intermediate the ends thereof and spaced above the level of the plate upon which the bottom edge 13 of the bubbler caps is adapted to rest. The ledge 12 is of such size that it is adapted to substantially block the bottom of the cap. As a specific example, a conventional circular type bubbler cap may have an outside diameter of, for example, about 4½ inches. The bubbler caps are secured to the risers by any suitable means, such as bolt 14 and nuts 15, whereby they are effectively blocked by the ledges 12 and prevented from rising under the influence of gaseous pressure.

The portion of the riser 10 beneath the ledge 12 may be formed with any desired outer dimensions, preferably not greater than that of the bubbler cap, but it is an advantage of the present invention that the same may be inset with respect thereto. This is illustrated in the drawing for it will be observed that the lower portion of the riser is relatively smaller in diameter than the bubbler cap and the ledge 12 is flanged outwardly therefrom. As a specific example, a conventional circular type bubbler cap may have an outside diameter of, for example, about 4½ inches. To insure adequate blocking of the bottom of such a bubbler cap, the ledge 12 should be slightly larger, for example, about 4¾ inches. The portion of the riser below the ledge, however, could be reduced to about 3 inches or less without critically reducing the size of the fluid passageway within the riser 10.

It will be apparent that, if desired, the riser 10 and bubbler cap 11 may be made as a single unit. However, in general, this is not believed to be preferable inasmuch as it is an advantage of the present invention that the readily available commercial types of bubbler caps may be utilized, and dismounting of the same for cleaning, repairs or replacement is facilitated.

By virtue of the fact that the slots 16 of the bubbler caps are spaced above the level of the plate 6 and the bottoms of the bubbler cap are effectively blocked, a reservoir of liquid is provided below the level of the slots whereby starvation of the plates due to the siphon effect is prevented, and spurting and surging resulting in inefficient operation and high entrainment does not occur. Moreover, the free flow of liquid on the plates may be facilitated by reducing the outer dimensions of the bases as described above.

The height of the ledge 12 above the plate 6 preferably is at least ½ inch. At this height, utilizing a conventional bubbler cap, the slots 16 which generally would be positioned about ½ inch above the ledge would be situated at a total distance of one inch above the plate. It will be appreciated that the height of the ledge may be varied over a wide range, in accordance with the invention, depending upon the particular process it is desired to carry out, and other factors. In general, at lower rates of gaseous flow, a smaller height may be utilized whereas at increasing rates the height may be increased proportionately to 2 inches or more. As a specific example, satisfactory results have been attained by utilizing a riser having a ledge disposed in the neighborhood of about 1⅞ inches above the level of the plate.

The liquid on the plates is maintained at a predetermined high level by means of dams 8 as described above. It generally is preferred to keep the level of liquid sufficiently high to adequately cover the slots 16. The most effective level for some operations may be, for example, about the tops of the bubbler caps or higher.

Inasmuch as the apparatus of the present invention may be operated at a high rate of gaseous flow, it is possible to treat greater quantities of liquid than it has been possible to treat heretofore. It is an advantage of the present invention that this increased quantity of liquid may be provided on the plates to increase the efficiency of the apparatus or at least without adversely affecting it.

In view of the relatively high level of liquid maintained on each of the plates in accordance with the present invention, it may be desirable to provide means for mixing the liquid to insure that all of the liquid will be treated substantially equally. This may be done advantageously and efficiently in accordance with the invention by providing one or more baffles 17 extending upwardly from the plates 6, preferably at right angles to the path of the liquid flowing across the plate. The number of such baffles may be varied over a wide range depending upon the process being carried out and the operating characteristics of the particular apparatus. The baffles 17 preferably are sufficiently low to have no effect upon the level of the liquid on the plate and to insure that the flow of liquid across the plate is not materially impeded. For example, adequate mixing may be obtained by utilizing baffles which extend no higher than about ⅛ inch below the level of the ledge 12 on the base 10. It may be desired to dispose one or more of the baffles 17 so that the upper edge thereof extends to within a short distance, for example, of about ½ inch of the slots 16 of one or more of the bubbler caps 11. In this way it is certain that all of the liquid during its passage across the plate 6 will pass within about ½ inch of the gaseous flow thus insuring adequate treatment of all of the liquid by the gas.

As a result of the smooth operation of the apparatus of the present invention even at relatively high rates of gaseous flow whereby spurting and surging may be materially decreased, there is less entrainment of liquid, for example, in the form of large droplets, in the gas than occurs with the apparatuses of the prior art at the same rates of flow. If the space between the plates is sufficient, a large percentage of such droplets will lose their kinetic energy and drop again to the plate. In the apparatus of the present invention, the relatively high level of liquid on the plates 6 decreases the effective clearance between the plates and as a result, less space is available in which the droplets may settle out. It has been found in accordance with the invention, however, that an effective separation of the droplets may be obtained even at smaller plate clearances by positioning deflectors 18 below the apertures 9. The deflectors 18 may be of any suitable size and design for causing separation of the droplets. Effective results may be obtained, for example, by utilizing a substantially circular deflector having a turned down edge or flange 19. As a specific example, the diameter of the deflector may be about 4½ inches and the deflector may be positioned about 1 inch below the aperture in the plate. The foregoing is given merely by way of illustration and it will be appreciated that in accordance with the invention, the size and shape of the deflectors may be varied over a wide range.

The manner of mounting the deflectors 18 is not critical. As shown in the drawing merely by way of illustration, the deflectors 18 may be mounted on bracket 20 and secured to the bubbler cap assembly by means of the bolt 14.

Even at the high rates of gaseous flow which may be utilized in accordance with the present invention, the amount of entrainment is less than is observed with the apparatuses of the prior art at lower gas velocities. Although it is not intended to limit the invention to a particular theory of operation, it is believed that the nature of the entrainment of liquid droplets is different than that occurring at lower gas velocities with the apparatuses of the prior art. It has been found that the deflectors 18 cause an unexpectedly marked decrease in entrainment, for example, of the order of about 35%. It is apparent that an unexpectedly greater efficiency of the deflectors occurs at the higher velocities which may be utilized in accordance with the present invention possibly because of a difference in the size and the type of dispersion of the liquid droplets. Any large droplets of liquid thrown up from the plate below impinge upon the baffles which are directly below the apertures in the plate above, and thus are prevented from passing directly therethrough. The droplets which are prevented from entering the apertures tend to fall back to the plate below whereas if they were permitted to reach the restricted area and consequently high velocity in the apertures they would be carried through to the plate above as entrainment.

It is an advantage of the present invention that the improved apparatus may be operated not only at the highest ranges possible with the prior art apparatuses which heretofore would be accompanied by a marked loss of efficiency but may be operated at ranges considerably beyond that heretofore thought feasible and at which the prior art apparatuses failed badly.

By reason of the efficient operation of the improved apparatus of the present invention at high vapor velocities, it will be apparent that the capacity of a given counter-current contacting apparatus may be materially increased or, conversely, that the same capacity may be obtained with a relatively smaller apparatus. This is important commercially for it represents a desirable saving in required space and cost of the apparatus.

It will be apparent from the present disclosure that the improved apparatus has many advantages, some of which may not be specifically described, and that, in view of the disclosure, the invention may be susceptible to variation by one skilled in the art. All such advantages and variations are intended to be within the scope of the invention.

I claim:

1. In counter-current contacting apparatus having a perforated plate, a bubbler cap assembly comprising a bubbler cap, a riser mounted on said plate having a smaller cross-sectional area than said bubbler cap, a ledge on said riser above the level of the plate and flanged outwardly from said riser for blocking the bottom of the bubbler cap, and means for positioning the bubbler cap on said ledge.

2. In counter-current contacting apparatus, the combination of a plate having an opening therein, a riser for supporting a bubbler cap disposed over said opening and forming a fluid passageway extending upwardly from said opening, an outwardly extending surface between the ends of the riser for supporting the bubbler cap on the riser with its bottom blocked by said surface, an entrainment separator mounted below the opening in the plate and means connecting said bubbler cap and entrainment separator and securing them to said riser and said plate.

3. In counter-current contacting apparatus having a perforated plate, a bubbler cap assembly comprising a bubbler cap, a tubular riser mounted on said plate having a smaller cross-sectional area than said bubbler cap, means intermediate the ends of said riser and disposed above the plate adapted to engage and block the bottom of the bubbler cap, and means for positioning the bubbler cap on said last named means.

4. In counter-current contacting apparatus having a perforated plate, a bubbler cap assembly comprising a bubbler cap, a riser mounted on said plate having a smaller cross-sectional area than said bubbler cap, a ledge extending outwardly from said riser between its ends at least ½ inch above the plate for engaging and blocking the bottom of the bubbler cap, and means for positioning the bubbler cap on the ledge.

WILLIAM C. ROUSSEAU.